US009683077B2

(12) United States Patent
Coates et al.

(10) Patent No.: US 9,683,077 B2
(45) Date of Patent: Jun. 20, 2017

(54) COPOLYMERIZATION OF PROPYLENE OXIDE AND CARBON DIOXIDE WITHOUT PRODUCTION OF PROPYLENE CARBONATE

(71) Applicant: Cornell Research Foundation, Inc., Ithaca, NY (US)

(72) Inventors: Geoffrey W. Coates, Ithaca, NY (US); Stephen Lee, Ithaca, NY (US); Zengquan Qin, Copley, OH (US); Nicholas J. Robertson, Ithaca, NY (US)

(73) Assignee: Cornell Research Foundation, Inc., Ithaca, NY (US)

( * ) Notice: Subject to any disclaimer, the term of this patent is extended or adjusted under 35 U.S.C. 154(b) by 0 days.

(21) Appl. No.: 14/669,882

(22) Filed: Mar. 26, 2015

(65) Prior Publication Data

US 2015/0307658 A1 Oct. 29, 2015

Related U.S. Application Data

(62) Division of application No. 13/692,289, filed on Dec. 3, 2012, now abandoned, which is a division of application No. 13/313,644, filed on Dec. 7, 2011, now abandoned, which is a division of application No. 11/889,236, filed on Aug. 10, 2007, now Pat. No. 8,093,351.

(60) Provisional application No. 60/839,682, filed on Aug. 24, 2006.

(51) Int. Cl.
*B01J 27/053* (2006.01)
*C08G 64/02* (2006.01)
*C01C 3/08* (2006.01)
*C08G 64/34* (2006.01)
*C08G 65/26* (2006.01)
*B01J 27/26* (2006.01)

(52) U.S. Cl.
CPC ............ *C08G 64/0208* (2013.01); *C01C 3/08* (2013.01); *C08G 64/34* (2013.01); *C08G 65/2603* (2013.01); *C08G 65/2663* (2013.01)

(58) Field of Classification Search
CPC .................................................... B01J 27/053
USPC ................................................. 502/217, 175
See application file for complete search history.

(56) References Cited

U.S. PATENT DOCUMENTS

| 3,278,457 | A | 10/1966 | Milgrom |
| 3,278,458 | A | 10/1966 | Belner |
| 3,278,459 | A | 10/1966 | Herold |
| 3,404,109 | A | 10/1968 | Milgrom |
| 4,500,704 | A | 2/1985 | Kruper, Jr. et al. |
| 4,826,887 | A | 5/1989 | Kuyper et al. |
| 4,826,952 | A | 5/1989 | Kuyper et al. |
| 4,826,953 | A | 5/1989 | Kuyper et al. |
| 5,158,922 | A | 10/1992 | Hinney et al. |
| 5,482,908 | A | 1/1996 | Le-Khac |
| 5,767,323 | A | 6/1998 | Televantos et al. |
| 5,789,626 | A | 8/1998 | Le-Khac |
| 5,900,384 | A | 5/1999 | Soltani-Ahmadi et al. |
| 6,204,357 | B1 | 3/2001 | Ooms et al. |
| 6,291,388 | B1 | 9/2001 | Hofmann et al. |
| 6,713,599 | B1 | 3/2004 | Hinz et al. |
| 7,399,822 | B2 | 7/2008 | Coates et al. |
| 2003/0149232 | A1 | 8/2003 | Hinz et al. |
| 2008/0051554 | A1 | 2/2008 | Coates et al. |
| 2008/0177025 | A1 | 7/2008 | Hofmann |

FOREIGN PATENT DOCUMENTS

| CN | 1640544 A | 7/2005 |
| JP | S47-29600 U | 12/1972 |
| JP | S61-115024 A | 6/1986 |
| JP | H02-142824 A | 5/1990 |
| JP | H03-88821 A | 4/1991 |
| JP | H06-41292 A | 2/1994 |
| JP | 2000-237596 A | 9/2000 |
| JP | 2000-513389 A | 10/2000 |
| JP | 2008-194681 A | 8/2008 |
| JP | 2008-546785 A | 12/2008 |
| WO | WO-2008/024363 A2 | 2/2008 |

OTHER PUBLICATIONS

Chen, et al., Copolymerization of carbon dioxide and propylene oxide and highly effective zinc hexacyanocobaltate (III)-based coordination catalyst, Polymer, 45:6519-6524 (2004).
Chisholm, et al., Articles Poly(propylene carbonate) Macromolecules, 35(17):6494-6504 (2002).
Csaszar, et al., Magnetic and spectroscopic investigation of polynuclear complex cyanides, Acta Chimica Academiae Scientiarum hungaricae, 47:37-51 (1965).
Darensbourg, et al., Synthesis and Structural Characterization of Double Metal Cyanides of Iron and Zing: Catalyst Percursors for the Copolymerization of Cardon Dioxide and Epoxides, Inorganic Chemistry, 42:7809-7818 (2003).
Darensbourg, et al., Toward the Design of Double Metal Cyanides for the Copolymerization of $CO_2$ and Epoxides, Inorganic Chemistry, 40:6543-6544 (2001).
Dunbar, et al., Chemistry of Transition Metal Cyanide Compounds: Modern Perspectives, Progress in Inorganic Chemistry, 45:283-391 (1997).

(Continued)

*Primary Examiner* — Duc Truong

(74) *Attorney, Agent, or Firm* — Choate, Hall & Stewart LLP; Charles E. Lyon; Michael A. Shinall

(57) ABSTRACT

Copolymers of propylene oxide and carbon dioxide and homopolymers of propylene oxide are made using two dimensional double metal cyanide complexes having the formula $Co[M(CN)_4]$ or hydrated or partially dehydrated form thereof. There is no propylene carbonate by product in the copolymerization.

4 Claims, No Drawings

(56) References Cited

OTHER PUBLICATIONS

Extended European Search Report for 07837164.8, 6 pages (May 26, 2010).

Garcia, et al., New Heterogeneous Catalysis for the Synthesis of Poly(ether polyol)s, Journal of Applied Polymer Science, 86:1553-1557 (2002).

Huang, et al., Controlled Ring-Opening Polymerization of Propylene Oxide Catalyzed by Double Metal-Cyanide Complex, Journal of Polymer Science, 40:1142-1150 (2002).

International Search Report for PCT/US2007/018507, 1 page (Feb. 27, 2008).

Joergensen, et al., Photoelectron spectra induced by x-rays of above 600 nonmetallic compounds containing 77 elements, Matematisk-Fysiske Meddelelser-Kongelige Danske Videnskabernes Selskab, pp. 65-66 (1972).

Kim, et al., Polymerization of propylene oxide by using double metal cyanide catalysts and the application to Polyurethane elastomer, Polymer, 44:3417-3428 (2003).

Kim, et al., Preparation of multi-metal cyanide catalysts and ring-operating polymerization of propylene oxide, Catalysis Today, 93-95:511-516 (2004).

Luinstra, et al., Manufacture—from oxiranes and CO2, BASF Germany;Chem Abstract, 145:46398, 3 pages (2006).

Mullica, et al., Crystal Structure of $ZN_3[Co(CN)_6]_2 \cdot 12H_2O$, Acta Crystalline, 34:3558-3561 (1978).

Niu, T. et al., Diaquacobalt Tetracyanonickelate Tetrahydrate, Acta Crystalline, 54:565-567 (1998).

O'Sickey, et al., Structure-Property Relationships of Poly(urethane urea)s with Ultra-low Monol Content Poly(propylene glycol) Soft Segments. I. Influence of Soft Segment Molecular Weight and Hard Segment Content, Journal of Applied Polymer Science, 84:229-243 (2002).

Robertson, N.J. et al., Two-Dimensional Double Metal Cyanide Complexes: Highly Active Catalysts for the Homopolymerization of Propylene Oxide and Copolymerization of Propylene Oxide and Carbon Dioxide, Dalton Translations, 2006—Electronic Supplementary Information, S1-S10.

Robertson, N.J. et al., Two-Dimensional Double Metal Cyanide Complexes: Highly Active Catalysts for the Homopolymerization of Propylene Oxide and Copolymerization of Propylene Oxide and Carbon Dioxide, Dalton Translations, 5390-5395 (2006).

Sarbu, et al., Non-fluorous polymers with very high solubility in supercritical $CO_2$ down to low pressures, Nature, 405:165-168 (2000).

STN Accession No. 64:64470, Database CA Chemical Abstracts Service, 2 pages (1966), last accessed Oct. 5, 2010.

STN Accession No. 79:11782, Database CA Chemical Abstracts Service, 5 pages (1972) last accessed Oct. 5, 2010.

Written Opinion for PCT/US2007/018507, 4 pages (Feb. 27, 2008).

COPOLYMERIZATION OF PROPYLENE OXIDE AND CARBON DIOXIDE WITHOUT PRODUCTION OF PROPYLENE CARBONATE

CROSS-REFERENCE TO RELATED APPLICATIONS

This application is a divisional of U.S. patent application Ser. No. 13/692,289, filed Dec. 3, 2012 (now abandoned), which is a divisional of U.S. patent application Ser. No. 13/313,644, filed Dec. 7, 2011 (now abandoned), which is a divisional of U.S. patent application Ser. No. 11/889,236, filed Aug. 7, 2007 (issued as U.S. Pat. No. 8,093,351), which claims priority to U.S. Provisional Patent Application No. 60/839,682, filed Aug. 24, 2006, the entirety of each of which is herein incorporated by reference.

This invention was made at least in part with U.S. Government support under NSF grant numbers CHE-0243605 and DMR-0079992. The Government has certain rights in the invention.

TECHNICAL FIELD

This invention is directed to homopolymerization of propylene oxide and copolymerization of propylene oxide and carbon dioxide, using double metal cyanide catalysts.

BACKGROUND OF THE INVENTION

Zinc hexacyanometalates have been used for epoxide/carbon dioxide copolymerization. A drawback to these catalysts is that undesired by-product propylene carbonate (requiring purification) is also formed unless such low temperatures are utilized that catalyst activity is significantly reduced.

SUMMARY OF THE INVENTION

It has been discovered herein that tetracyanometallate containing double metal cyanide complexes readily catalyzed the copolymerization of propylene oxide and carbon dioxide without the formation of propylene carbonate. These complexes are also functional to catalyze the homopolymerization of propylene oxide.

In one embodiment of the invention herein, denoted the first embodiment, the invention is directed to a method for the non-alternating copolymerization of rac-propylene oxide or enantiomerically enriched propylene oxide and carbon dioxide to produce

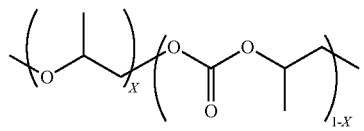

where x ranges from 1.0 to 0.46 and $M_n$ ranges from 500 to 500,000 g/mol, e.g. 10,000 to 500,000 g/mol. This method comprises the step of copolymerizing rac-propylene oxide or enantiomerically enriched propylene oxide and carbon dioxide in the presence of a catalytically effective amount of a double metal cyanide complex containing a tetracyanometallate moiety, e.g., anhydrous $Co[M(CN)_4]$ where M is selected from the group consisting of Ni, Pd and Pt and combinations thereof, or hydrated or partially dehydrated form thereof.

In another embodiment of the invention herein, denoted the second embodiment, the invention is directed to a method for the homopolymerization of rac-propylene oxide or enantiomerically enriched propylene oxide, comprising the step of polymerizing rac-propylene oxide or enantiomerically enriched propylene oxide in the presence of a catalytically effective amount of a double metal cyanide complex containing a tetracyanometallate moiety, e.g., anhydrous $Co[M(CN)_4]$ where M is selected from the group consisting of Ni, Pd and Pt and combinations thereof, to produce poly(propylene oxide) having $M_n$ ranging from 500 to 250,000 g/mol.

In another embodiment of the invention, denoted the third embodiment, the invention is directed to a method of preparing $Co[M(CN)_4]$ comprising reacting cobalt salt, preferably $Co(SO_4)$, and $K_2[M(CN)_4]$ to form hydrated $Co[M(CN)_4]$ and dehydrating the hydrated $Co[M(CN)_4]$ to produce anhydrous $Co[M(CN)_4]$ where M is selected from the group consisting of Ni, Pt and Pd.

In another embodiment herein, denoted the fourth embodiment, the invention is directed to the method of preparing anhydrous $Co[M(CN)_4]$, where M is selected from the group consisting of Ni, Pt, and Pd, comprising the step of dehydrating microcrystalline $Co(H_2O)_2[M(CN)_4]\cdot 4H_2O$. As used herein the term microcrystalline means having crystal dimensions less than 1.0 mm in the narrowest dimension.

In another embodiment herein, denoted the fifth embodiment, the invention is directed at $Co[Pt(CN)_4]$.

In still another embodiment herein, denoted the sixth embodiment, the invention is directed at $Co[Pd(CN)_4]$.

In still another embodiment, denoted the seventh embodiment, the invention is directed to a method for non-alternating copolymerization of

(I)

where R in (I) is selected from the group consisting of hydrogen, $C_2$-$C_{18}$-alkyl, $C_6$-$C_{18}$-aryl, $C_1$-$C_{20}$ halide (e.g., F, I, Cl, Br) containing alkyl, and $C_1$-$C_{20}$ oxygen-containing alkyl, and carbon dioxide (II), comprising the step of copolymerizing (I) and (II) in the presence of a catalytically effective amount of double metal cyanide complex containing a tetracyanometallate moiety, to produce polyether-polycarbonate having the formula

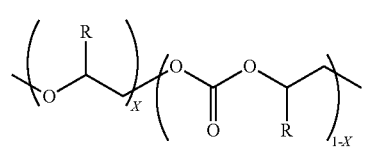
(III)

where x ranges from 1.0 to 0.46 and $M_n$ of (III) ranges from 500 to 500,000 g/mol, e.g., 10,000 to 500,000 g/mol.

In another embodiment herein, denoted the eighth embodiment, the invention is directed to a method for homopolymerization of

where R in (I) is selected from the group consisting of hydrogen, $C_2$-$C_{18}$-alkyl, $C_6$-$C_{18}$-aryl, $C_1$-$C_{20}$ halide (e.g., F, I, Cl, Br) containing alkyl, and $C_1$-$C_{20}$ oxygen-containing alkyl, comprising the step of polymerizing (I) in the presence of a double metal cyanide complex containing a tetracyanometallate moiety to produce poly(substituted ethylene oxide (I)) having the formula

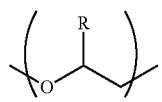

where R is as defined above, and $M_n$ ranges from 500 to 250,000 g/mol.

The term "tetracyanometallate moiety" is used herein to refer to metal surrounded by and bound to four cyanides where the metal is bound to the carbon atoms of the cyanide ligands.

The term "enantomerically enriched propylene oxide is used herein to mean propylene oxide where the ratio of enantiomers is not 50:50.

Alternating polymerization provides A-B-A-B-A-B-A-B, etc. where A represents propylene oxide unit (PO unit) and B a $CO_2$ unit, i.e., there are no adjacent propylene oxide units. In non-alternating polymerization, the product contains adjacent propylene oxide units.

In many cases there are more PC units than PO units. $PO/CO_2$ copolymers, with approximately 15% carbonate units are considered to be soluble in supercritical $CO_2$ apparently because of surfactant functionality. (Sarbu, J., et al., Nature 405, 165-168 (2000)).

As used herein and $M_n$, $M_w$ and $M_x/M_n$ (PDI) are determined by gel permeation chromatography calibrated with polystyrene standards in tetrahydrofuran at 40° C.

DETAILED DESCRIPTION

Elements of the invention and working examples are found in Robertson, N. J., et al., Dalton Trans., 2006, 5390-5395 and Electronic Supplementary Information, pages S1-S10, the whole of both of which are incorporated herein by reference.

We turn firstly to the catalyst.

The catalyst for the first embodiment has the formula $Co[M(CN)_4]$ where M is selected from the group consisting of Ni, Pt and Pd and combinations thereof. For the first embodiment the catalyst can be in hydrated form, e.g., $Co(H_2O)_2[M(CN)_4].4H_2O$, partially dehydrated form, e.g., $Co(H_2O)_2[M(CN)_4]$, or anhydrous form, i.e., $Co[M(CN)_4]$.

The catalyst for the second embodiment has the formula $Co[M(CN)_4]$ where M is selected from the group consisting of Ni, Pd and Pt and combinations thereof, in the anhydrous form, i.e., homopolymerization was obtained with the anhydrous form but not with the hydrated or partially dehydrated forms.

The catalysts are prepared by forming hydrated form using a modified procedure of that described in Niu, T., Crisci, G., Lu, T. and Jacobson, A. J., Acta Cryst., Sect. C, 54, 565-567 (1998), the whole of which is incorporated herein by reference. An aqueous solution of $K_2[M(CN)_4]$ is reacted with aqueous solution of $Co^{II}$-based salt to produce $Co(H_2O)_2[M(CN)_4].4H_2O$. The use of $Co(SO_4)$ was used in place of the $Co(SCN)_2$ used by Jacobson. It was found that the use of $Co(SO_4)$ in this synthesis yields the $Co[M(CN)_4]$ complexes with higher activities in the as made form, i.e., without extensive washing, that is higher than when the complexes were made utilizing other cobalt sources. For example, when $Co(SCN)_2$ is used, extensive washing is required to obtain the same activity as when $Co(SO_4)$ is used without extensive washing, and when $CoCl_2$ is used, extensive washing is required to prevent chloride poisoning of the active catalyst. Vacuum filtering of reaction product yields hydrated catalyst. Drying in vacuo for a protractice time, e.g., overnight, gives anhydrous catalyst. Drying in vacuo for a short time, e.g., 1 hour, gives partially dehydrated catalyst.

The starting materials $K_2[Ni(CN)_4]$, $K_2[Pt(CN)_4]$ and $K_2[Pd(CN)_4]$ are all commercially available.

Working Example I, hereinafter, is directed to preparation of $Co(H_2O)_2[Ni(CN)_4].4H_2O$ and $Co[Ni(CN)_4]$. Working Example II, hereinafter, is directed to synthesis of $Co[Pt(CN)_4]$ and $Co[Pd(CN)_4]$.

We turn now to reaction conditions for the first embodiment besides the description of the catalyst.

The mole ratio of propylene oxide charged to catalyst charged PO:Co mole ratio basis, can range, for example, from 100:1 to 100,000:1, e.g., 100:1 to 5000:1, e.g., 500:1 to 2000:1.

The carbon dioxide pressure can range, for example, from ambient pressure (e.g., 1 atmosphere) to 1500 psig. When the carbon dioxide pressure is greater than 1 atmosphere, e.g., is 800 psig, the pressure defines the amount of carbon dioxide. When the carbon dioxide pressure is ambient, the amount of carbon dioxide is provided by the headspace in the reactor, e.g., 200 to 1000 ml. When the pressure is increased, the amount of carbonate units increases but catalyst activity decreases, The copolymerization can be carried out neat (without other solvent, i.e., the liquid propylene oxide acts as the reaction medium) or in hydrocarbon solvent, e.g., toluene or xylene.

In runs carried out, copolymerizations were carried out neat and in toluene.

The temperature at which the copolymerization is carried out, can range, for example from 10° C. to 150° C., e.g., 25 to 135° C. Catalyst activity increases with increasing temperature. Longer reaction time can accommodate for lower temperature.

Reaction times range, for example, from 15 minutes to 5 days, e.g. 30 minutes to 30 hours.

A representative copolymerization procedure is as follows: A 100 mL Parr autoclave equipped with a mechanical stirrer is dried under vacuum at 80° C. for 2 h and then transferred to a drybox to cool to 22° C. $Co[Ni(CN)_4]$ (10.0 mg, 0.0450 mmol) is put into a glass sleeve in the autoclave. Toluene (8.0 mL) and PO (8.0 mL, 0.11 mol) were added under nitrogen via an injection port. The autoclave is pressurized to 34.0 atm and then heated to 90° C. over 20 min. During this time the pressure increases to the desired 54.4 atm. If the $CO_2$ pressure is lower than desired once heating is complete, additional $CO_2$ is added to reach the desired pressure. The total reaction time from initial pressurizing is 1 h. The autoclave is cooled and vented to yield a large polymer mass, which was dissolved in $CHCl_3$ to ensure the same was homogeneous before taking an aliquot for $^1H$ NMR analysis. The solvent is removed by rotary evaporation and the resulting polymer is dried in vacuo at 50° C. to a constant weight to determine polymer yield (4.77 g, 60%). The resulting polymer is dissolved in toluene and treated with 10% aqueous $NH_4OH$ (20 mL) to remove the catalyst and then dried in vacuo to a constant mass.

Working examples of copolymerization are given in Working Examples III-XVI hereinafter.

In all cases the copolymers formed are regioregular and atactic as determined by $^{13}C\{^1H\}NMR$ spectroscopy and are amorphous.

$M_n$ can range, for example, from 500 to 500,000 g/mol, e.g., 10,000 to 500,000 g/mol or 15,000 to 250,000 g/mol, with $M_w/M_n$ (PDI) ranging, for example, from 1.9 to 5.8, usually about 2.0 to 4.0. The $M_n$ can be reduced by an order of magnitude, e.g., to 500 to 25,000 or 5,000 g/mole, by addition of chain transfer agent (CTA), e.g., alcohol, e.g., methanol, glycerol or polyhydroxy compound such as PG425 polyol (which is polypropylene glycol of molecular weight of 425 g/mol, or carboxylic acid, e.g., acetic acid, into the reaction mixture, e.g., in an amount of 1 to 500 equivalents of CTA versus $Co[Ni(CN)_4]$. No propylene carbonate formation was observed in $^1H$ NMR spectroscopic analysis in any of the runs carried out.

We turn now to the second embodiment.

The catalyst and its preparation is described above.

The mole ratio of propylene oxide charged to catalyst charged, can range, for example, from 100:1 to 5000:1. Working examples were carried out at 2530:1 PO:Co mole ratio.

The polymerization is readily carried out at ambient pressure.

The reaction can be carried out neat (i.e., without other solvent and the liquid propylene oxide acts as the reaction medium) or in the solvents described for the first embodiment.

Temperatures at which homopolymerization can be carried out range, for example, from 10° C. to 150° C., e.g. 50-100° C.

Times at which the homopolymerization is carried out, ranges, for example, from 15 minutes to 5 days, e.g. 30 minutes to 24 hours.

Working Example XVII is directed to the homopolymerization reaction.

The homopolymers formed have $M_n$ ranging from 500 to 500,000 g/mol, e.g., 10,000 to 500,000 g/mol or e.g., about 40,000 to 200,000 g/mol, with PDI ranging from 1.5 to 5, e.g., 1.9 to 2.5. The $M_n$ can be reduced by an order of magnitude, e.g., to 500 to 25,000 or 5,000 g/mole, by addition of chain transfer agent, e.g., those mentioned as CTAs above, into the reaction mixture, e.g., in an amount of 1 to 500 equivalents of CTA versus $Co[Ni(CN)_4]$.

The homopolymers formed are regioregular and atactic and are amorphous.

The copolymers and homopolymers made herein are useful for polyurethane synthesis and the polyurethanes are useful as materials for forming foam cushions.

We turn now to the third embodiment.

As indicated above, the use of $Co(SO_4)$ as the cobalt salt results in as made catalyst with much higher activity than when other cobalt salts, e.g., $CoCl_2$ or $Co(SCN)_2$ are used. Catalysts made with other salts require extensive washing, e.g., multiple washings of the complex on filter paper with water, for the same activity. The higher activity is manifested by amount of polymer formed per amount of catalyst being higher in a given amount of time.

We turn now to the fourth embodiment.

Microcrystalline hydrated catalyst is better as a starting compound for dehydration because it has a higher surface area than larger crystalline hydrated catalyst.

We turn now to the fifth embodiment.

$Co[Pt(CN)_4]$ can be prepared as described above starting with $K_2[Pt(CN)_4]$ which is commercially available.

We turn now to the sixth embodiment.

$Co[Pd(CN)_4]$ can be prepared as described above starting with $K_2[Pd(CN)_4]$ which is commercially available. It catalyzes more $CO_2$ incorporation than does $Co[Ni(CN)_4]$ at the same conditions.

We turn now to the seventh embodiment. A species of this is the method of the first embodiment.

We turn now to the eighth embodiment. A species of this is the method of the second embodiment.

The complex used as catalyst for the seventh and eighth embodiments is preferably $Co[M(CN)_4]$, e.g., where M is Ni.

The invention is illustrated by the following working examples.

Working Example I

Preparation of $Co[Ni(CN)_4]$

The complex $Co(H_2O)_2[Ni(CN)_4]\cdot 4H_2O$ was prepared using a modified procedure of Niu et al., cited above, substituting $CoSO_4$ for $Co(SCN)_2$. With vigorous stirring, 10 mL of a 0.23 M aqueous $K_2[Ni(CN)_4]$ solution and 10 mL of a 0.23 M aqueous $CoSO_4$ solution were mixed. A pink precipitate instantly formed, and an additional 10 mL of distilled water were added to reduce the viscosity of the suspension. The mixture was stirred vigorously for 1 h and then vacuum filtered to yield a pink microcrystalline material. The powder X-ray data of this complex matched the calculated data for $Co(H_2O)_2Ni(CN)_4\cdot 4H_2O$. The complex was dried in vacuo at 60° C. for 10 h yielding the deep purple solid $Co[Ni(CN)_4]$ (0.42 g, 83%) that was subsequently ground into a powder with a mortar and pestle and then used in polymerizations. Thermogravimetric and elemental analyses revealed that >97% of the inter-layer water molecules were removed.

Working Example II

Preparation of $Co[M(CN)_4]$ Where M=Pd or Pt

The analogous complexes $Co[Pd(CN)_4]$ and $Co[Pt(CN)_4]$ were prepared using the same procedure as used in Working Example I for $Co[Ni(CN)_4]$. In each case, with vigorous stirring 10 mL of a 0.23 M aqueous $K_2[M(CN_4)]$ solution and 10 mL of a 0.23 M aqueous $CoSO_4$ solution were mixed and a pink precipitate instantly formed. In each case an additional 10 mL of distilled water was added, followed by vigorous stirring for 1 hour and vacuum filtering to recover product. Isolated yields were 89 and 84%, respectively. Thin pink-orange plates of $Co(H_2O)_2[Pd(CN)_4]\cdot 4H_2O$ for X-ray analysis were obtained by layering a solution of $CoCl_2\cdot 6H_2O$ in ethanol onto a solution of $K_2[Pd(CN)_4]\cdot 3H_2O$ in water and storing in a sealed test-tube at 22° C. for a period of two weeks.

Working Example III

Copolymerization Using $Co[Ni(CN_4)]$

The representative copolymerization procedure described above was varied as necessary to provide the conditions following. The catalyst was anhydrous Co[Ni(CN)$_4$]. Copolymerization was carried out for 1 hr with 16 mL of 7.1 M rac-PO in toluene, [PO]/[Co]=2530. Initial $CO_2$ pressure was 34 atm. The autoclave was heated to 130° C. The $CO_2$ pressure increased to 54.4 atm. Copolymer yield on drying in vacuo at 50° C. for 8 hours was 5.57 g. The carbonate fraction determined by $^1$H NMR spectroscopy (CDCl$_3$, 300 MHz) referenced versus non-deuterated solvent shifts ($^1$H, CHCl$_3$, δ 7.25) $f_{co2}$ was 0.20. The propylene oxide conversion (equal to polymer mass/(0.114 mol PO)[102$x_{fco2}$+(58x (1-$_{fco2}$)] was 73%. The turnover frequency, i.e. TOF, was 1860 where TOF equals (mole PO)·(mole Co)$^{-1}$·h$^{-1}$. $M_n$ was 74,300 g/mol. $M_w/M_n$ was 3.1. No propylene carbonate was observed.

Working Example IV

Copolymerization Using Co[Ni(CN$_4$)]

The procedure used in Working Example III was followed except the temperature of reaction was 110° C. Copolymer yield was 5.39 g. The $f_{co2}$ was 0.22. The conversion of PO was 70%. TOF was 1770. $M_n$ was 84,100 g/mol. $M_w/M_n$ was 2.9. No propylene carbonate was observed.

Working Example V

Copolymerization Using Co[Ni(CN)$_4$]

The procedure used in Working Example III was followed except that the temperature of reaction was 90° C. Copolymer yield was 4.77 g. The $f_{co2}$ was 0.27. The conversion of PO was 60%. TOF was 1510. $M_n$ was 86,000 g/mol. $M_w/M_n$ was 2.8. No propylene carbonate was observed.

In another case reaction was carried out as above except that the reaction was run in 8.0 mL neat rac-PO and the reaction time was 2 hours. Copolymer yield was 2.95 g. The $f_{co2}$ was 0.25. The conversion of PO was 37%. TOF was 470. $M_n$ was 3,000 g/mol. $M_w/M_n$ was 7.1. No propylene carbonate was observed.

Working Example VI

Copolymerization Using Co[Ni(CN)4]

The procedure used in Working Example III was followed except the temperature of reaction was 70° C. Copolymer yield was 3.79 g. The $f_{co2}$ was 0.3. The conversion of PO was 46%. TOF was 1170. $M_n$ was 152,000 g/mol. $M_w/M_n$ was 3.7. No propylene carbonate was observed.

Working Example VII

Copolymerization Using Co[Ni(CN)$_4$]

The procedure used in Working Example III was followed except the temperature of reaction was 50° C. Copolymer yield was 1.29 g. The $f_{co2}$ was 0.36. The conversion of PO was 15%. TOF was 390. $M_n$ was 163,000 g/mol. $M_w/M_n$ was 5.8. No propylene carbonate was observed.

Working Example VIII

Copolymerization Using Co[Ni(CN)$_4$]

The procedure used in Working Example III was followed except the temperature of reaction was 30° C. and the reaction time was 5 days. Copolymer yield was 7.19 g. The $f_{co2}$ was 0.56. The propylene oxide conversion was 76%. TOF was 16. $M_n$ was 148,000 g/mol. $M_w/M_n$ was 5.1. No propylene carbonate was observed.

Working Example IX

Copolymerization Using Co[Ni(CN)$_4$]

The procedure used in Working Example III was followed except the temperature of reaction was 70° C. and the $CO_2$ pressure after heating was 81.6 atm. Copolymer yield was 1.81 g. The $f_{co2}$ was 0.38. The propylene oxide conversion was 21%. TOF was 540. $M_n$ was 152,000 g/mol. $M_w/M_n$ was 4.3. No propylene carbonate was observed.

Working Example X

Copolymerization Using Co[Ni(CN)$_4$]

The procedure used in Working Example III was followed except the temperature of reaction was 70° C. and the $CO_2$ pressure after heating was 68.0 atm. Copolymer yield was 2.57 g. The $f_{co2}$ was 0.35. The propylene oxide conversion was 31%. TOF was 780. $M_n$ was 233,000 g/mol. $M_w/M_n$ was 4.8. No propylene carbonate was observed.

Working Example XI

Copolymerization Using Co[Ni(CN)$_4$]

The procedure used in Working Example III was followed except the temperature of reaction was 70° C. and the $CO_2$ pressure after heating was 40.8 atm. Copolymer yield was 3.92 g. The $f_{co2}$ was 0.27. The propylene oxide conversion was 44%. TOF was 1250. $M_n$ was 116,000 g/mol. $M_w/M_n$ was 3.5. No propylene carbonate was observed.

Working Example XII

Copolymerization Using Co[Ni(CN)$_4$]

The procedure used in Working Example III was followed except the temperature of reaction was 70° C. and the $CO_2$ pressure after heating was 27.2 atm. The copolymer yield was 3.74 g. The $f_{co2}$ was 0.23. The propylene oxide conversion was 48%. TOF was 1220. $M_n$ was 111,000 g/mol. $M_w/M_n$ was 2.6. No propylene carbonate was observed.

Working Example XIII

Copolymerization Using Co[Ni(CN)$_4$]

The procedure used in Working Example III was followed except the temperature of reaction was 70° C. and the $CO_2$ pressure after heating was 13.6 atm. The copolymer yield was 3.82 g. The $f_{co2}$ was 0.16. The propylene oxide conversion was 51%. TOF was 1300. $M_n$ was 222,000 g/mol. $M_w/M_n$ was 3.8. No propylene carbonate was observed.

Working Example XIV

Copolymerization Using Co[Pd(CN)$_4$]

The procedure used in Working Example III was followed except the catalyst was anhydrous Co[Pd(CN)$_4$], the reaction temperature was 90° C. and the reaction time was 24 hours. The $CO_2$ pressure after heating was 54.4 atm. The copolymer yield was 1.47 g. The $f_{co2}$ was 0.43. The propylene oxide conversion was 17%. TOF was 18. $M_n$ was 25,600 g/mol. $M_w/M_n$ was 3.6. No propylene carbonate was observed.

Working Example XV

Copolymerization Using Co[Pt(CN)$_4$]

The procedure used in Working Example III was followed except the catalyst was anhydrous Co[Pt(CN)$_4$], the reaction temperature was 90° C. and the reaction time was 24 hours. The $CO_2$ pressure after heating was 54.4 atm. The copolymer yield was 1.11 g. The $f_{co2}$ was 0.44. The propylene oxide conversion was 13%. TOF was 13. $M_n$ was 27,900 g/mol. $M_w/M_n$ was 3.7. No propylene carbonate was observed.

Working Example XVI

Copolymerizations Using Co[Ni(CN)4}

Made Using Various Cobalt Salts

Complexes were prepared as in Working Example I except that Co(NO$_3$)$_2$, Co(BF$_4$)$_2$, CoCl$_2$, and (CoSCN)$_2$ were used in place of CoSO$_4$. The prepared complexes were screened using the conditions of Working Example VI. Polymer masses obtained were 0.126 g of copolymer for Co(NO$_3$)$_2$, 0.765 g of copolymer for Co(BF$_4$), 0.563 g of copolymer for CoCl$_2$ and 0.305 g of copolymer for Co(SCN)$_2$. Based on these screens, the method to prepare Co[Ni(CN)$_4$] with highest activity was for catalyst prepared using CoSO$_4$.

Working Example XVII

Homopolymerization Using Co[Ni(CN)$_4$]

The procedure used in Working Example III was followed except no $CO_2$ was introduced and the temperature of reaction was 70° C. The $CO_2$ pressure after heating was 0 atm. The polymer yield was 5.19 g. The $f_{co2}$ was zero. The propylene oxide conversion was 78%. TOF was 1990. $M_n$ was 188,000 g/mol. $M_w/M_n$ was 3.6.

Working Example XVIII

Homopolymerization Using Co[Ni(CN)$_4$]

A 100 mL Parr autoclave equipped with a mechanical stirrer is dried under vacuum at 80° C. for 2 h and then transferred to a drybox to cool to 22° C. Co[Ni(CN)$_4$] (10 mg, 0.045 mmol) is put into a glass sleeve in the autoclave. Toluene (8 mL) and PO (8 mL, 0.1 mol) is added under nitrogen via an injection port. The autoclave is then heated to 90° C. over 20 min. The total reaction time after initial heating is 1 h. The autoclave is cooled and vented to yield a large polymer mass, which is dissolved in CHCl$_3$ to ensure the same is homogeneous before taking an aliquot for $^1$H NMR analysis. The solvent is removed by rotary evaporation and the resulting polymer is dried in vacuo at 50° C. to a constant weight to determine polymer yield (6.0 g, 91%). The resulting polymer is dissolved in toluene and treated with 10% aqueous NH$_4$OH (20 mL) to remove the catalyst and then dried in vacuo to a constant mass. $M_n$ is greater than 80,000 g/mol. $M_w/M_n$ is greater than 2.

Working Example XIX

Copolymerization of Epichlorohydrin and Carbon Dioxide

A 100 mL Parr autoclave equipped with a mechanical stirrer is dried under vacuum at 80° C. for 2 h and then transferred to a drybox to cool to 22° C. Co[Ni(CN)$_4$] (10 mg, 0.045 mmol) is put into a glass sleeve in the autoclave. Toluene (8 mL) and epichlorohydrin (R in (I) is —CH$_2$Cl) (8 mL, 0.10 mol) is added under nitrogen via an injection port. The autoclave is pressurized to 34.0 atm and then heated to 90° C. over 20 min. During this time the pressure increases to the desired 54.4 atm. The total reaction time after initial pressurizing is 24 h. The autoclave is cooled and vented to yield a polymer mass, which is dissolved in CHCl$_3$ to ensure the same was homogeneous before taking an aliquot for $^1$H NMR analysis. The solvent is removed by rotary evaporation and the resulting polymer is dried in vacuo at 50° C. to a constant weight to determine polymer yield (1.1 g, 10%). The resulting polymer is dissolved in toluene and treated with 10% aqueous NH$_4$OH (20 mL) to remove the catalyst and then dried in vacuo to a constant mass. $M_n$ is greater than 800 g/mol. $M_w/M_n$ is greater than 2.

Working Example XX

Homopolymerization of Epichlorohydrin

A 100 mL Parr autoclave equipped with a mechanical stirrer is dried under vacuum at 80° C. for 2 h and then transferred to a drybox to cool to 22° C. Co[Ni(CN)$_4$] (10 mg, 0.045 mmol) is put into a glass sleeve in the autoclave. Toluene (8 mL) and epichlorohydrin (R in (I) is —CH$_2$Cl) (8 mL, 0.10 mol) is added under nitrogen via an injection port. The autoclave is then heated to 90° C. over 20 min. The total reaction time after initial heating is 24 h. The autoclave is cooled and vented to yield a polymer mass, which is dissolved in CHCl$_3$ to ensure the same was homogeneous before taking an aliquot for $^1$H NMR analysis. The solvent is removed by rotary evaporation and the resulting polymer is dried in vacuo at 50° C. to a constant weight to determine polymer yield (1.8 g, 19%). The resulting polymer is dissolved in toluene and treated with 10% aqueous NH$_4$OH (20 mL) to remove the catalyst and then dried in vacuo to a constant mass. $M_n$ is greater than 800 g/mol. $M_w/M_n$ is greater than 2.

Variations

The foregoing description of the invention has been presented describing certain operable and preferred embodiments. It is not intended that the invention should be so limited since variations and modifications thereof will be obvious to those skilled in the art, all of which are within the spirit and scope of the invention.

What is claimed is:

1. A method of preparing a double metal catalyst of formula Co[M(CN)$_4$] comprising:
   a. reacting Co(SO$_4$) with K$_2$[M(CN)$_4$] to form a hydrated Co[M(CN)$_4$]; and
   b. dehydrating the hydrated Co[M(CN)$_4$] to produce the double metal catalyst of formula Co[M(CN)$_4$]; wherein M is selected from Ni, Pt, and Pd.

2. The method of claim 1, wherein M is Ni.
3. The method of claim 1, wherein M is Pt.
4. The method of claim 1, wherein M is Pd.

* * * * *